April 11, 1950     T. O. HOLM     2,503,618
SELECTOR VALVE
Filed April 18, 1946     2 Sheets-Sheet 1
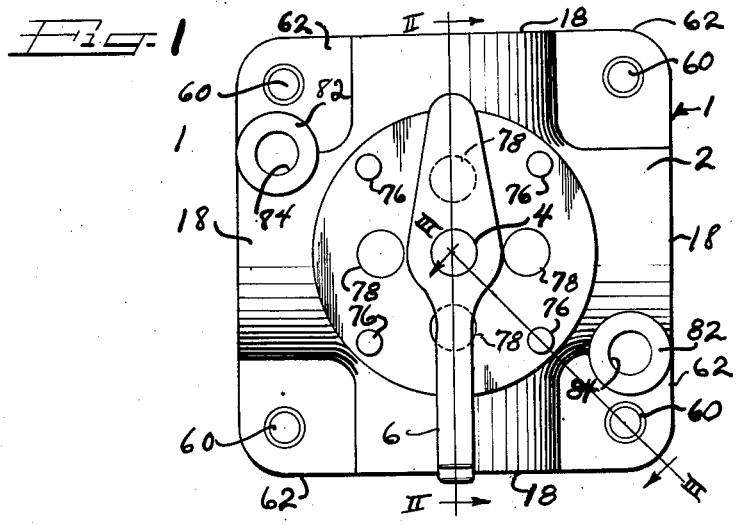
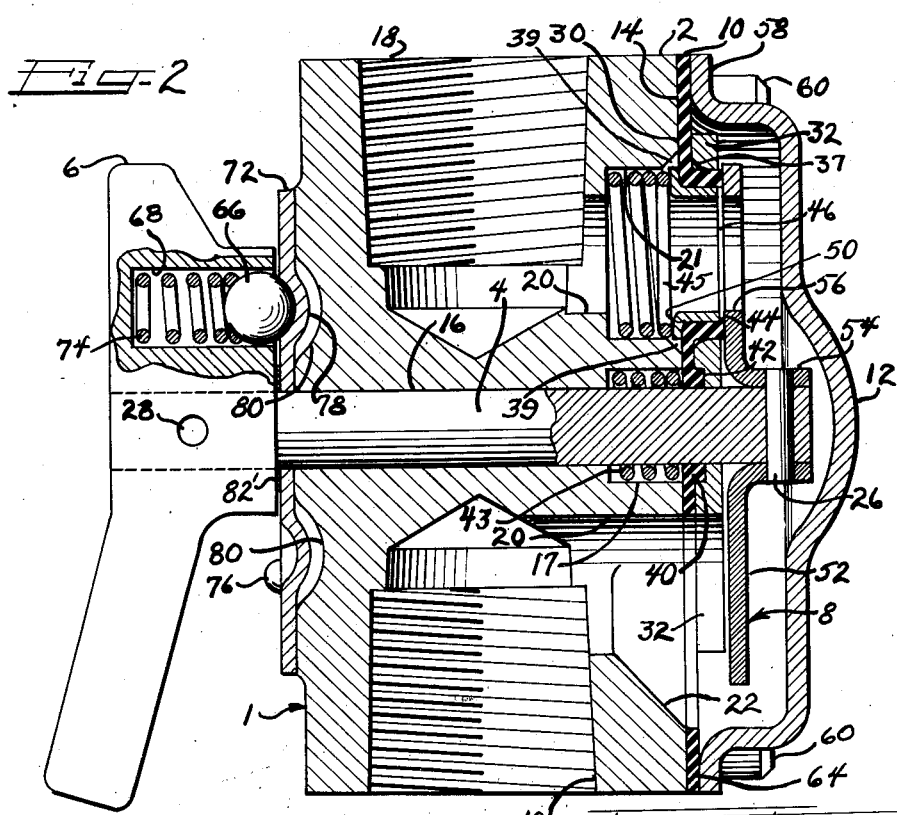
Inventor
THOR O. HOLM
by The Firm of Charles W. Hills Attys

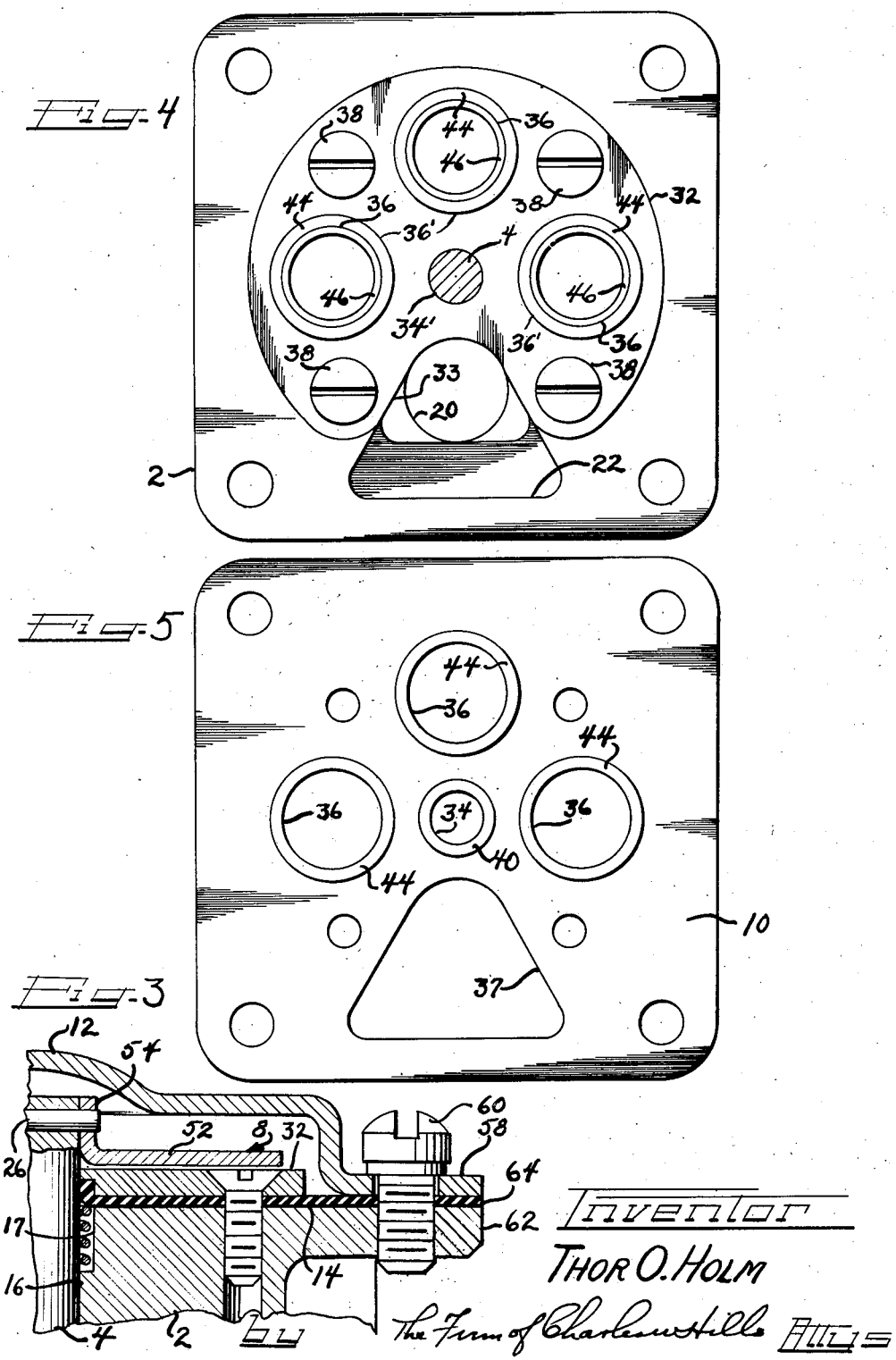

Patented Apr. 11, 1950

2,503,618

UNITED STATES PATENT OFFICE 2,503,618

SELECTOR VALVE

Thor O. Holm, Cleveland, Ohio, assignor to Thompson Products, Inc., Cleveland, Ohio, a corporation of Ohio Application April 18, 1946, Serial No. 663,181

7 Claims. (Cl. 251—84)

1

This invention relates to a fluid flow control device, and particularly, to an improved selector valve of the type utilizing a rotary, disk-like valve member.

A feature of this invention is the unusual simplicity of design of the selector cock and of each of its components, permitting the selector cock to be manufactured at greatly reduced cost, inasmuch as few machining operations are required for manufacture of its individual components. The design is such that substantially all of the components of the improved selector cock may be produced by casting, molding or stamping processes, which are particularly adaptable to large quantity, low cost manufacture.

According to this invention, a ported casing is provided having a central hole therethrough to accommodate the operating shaft of the selector valve and the plurality of ports provided in the casing all open in a substantially planar end face of the casing in surrounding relation to the central operating shaft hole therein.

A particular feature of this invention is the provision of a unitary seal member which accomplishes a multiplicity of sealing functions in the selector cock and in fact, comprises the only seal utilized in the valve. The central portion of such seal member is so constructed as to provide a fluid seal between the casing and the rotatable operating shaft. In addition, a plurality of integrally formed annular projections on the seal member surround each of the port openings and cooperate with a disk-like valve member to provide a seal between the valve disk and the casing. Finally, the peripheral portions of the seal member are utilized as a gasket providing a seal between the periphery of the casing and a cover which encloses the valve disk.

A further feature of this invention is the provision of counterbores in each of the port openings and in the central opening surrounding the operating shaft which counterbores respectively accommodate springs which in turn act upon adjacent portions of the resilient seal member to improve the sealing properties thereof.

Accordingly, it is an object of this invention to provide an improved fluid flow control device of the selector valve type.

Another object of this invention is to provide an improved selector valve construction characterized by the simplicity of its components and the ease of manufacture thereof, resulting in a selector valve unit of extremely low cost.

A further object of this invention is to provide an improved construction of a selector valve utilizing a disk-like valve member wherein a single resilient seal member may be utilized to accomplish all of the sealing functions required within the selector valve structure.

The specific nature of the invention as well as other objects and advantages thereof will be apparent to those skilled in the art from the following detailed description of the annexed sheets of drawings which, by way of preferred example only, illustrate one embodiment of the invention.

On the drawings:

Figure 1 is a top elevational view of an assembled selector valve embodying this invention.

Figure 2 is a vertical sectional view taken along the plane II—II thereof.

Figure 3 is a partial sectional view of Figure 1 taken along the plane III—III thereof.

Figure 4 is a bottom elevational view of the selector valve of Figure 1 with the cover and valve disk removed.

Figure 5 is an elevational view of the unitary seal member utilized in the selector valve of Figure 1.

As shown on the drawings:

A selector valve embodying this invention as indicated generally by the numeral 1 and essentially comprises a ported casing 2, an operating shaft 4, operating knob 6, disk-like valve member 8, a unitary resilient seal 10, and a cover 12.

The casing 2 preferably comprises a generally rectangular member having a substantially planar end face 14, and a central hole 16 opening in end face 14 and arranged to rotatably accommodate the operating shaft 4. A plurality of ports 18 which are generally radially disposed with respect to the central hole 16 are formed in casing 2 and respectively communicate with a plurality of ports 20 which are disposed in substantially parallel relationship with the central hole 16 and open in the end face 14 in surrounding relation to the central hole 16.

Each of the radial ports 18 is provided with suitable internal threads to receive conventional coupling fixtures to connect the selector valve with the fluid system which it is to control. For purposes of illustration, the selector valve 1 has been shown to be of the type having a single outlet port and three inlet ports. The bottom port opening shown in Figure 2 of the drawings has been constructed to function as the single outlet port and accordingly the corresponding port opening in end face 14 is transversely enlarged as indicated at 22 for a purpose that will be described. The central opening 16 is provided with a counterbore 17 while each of the inlet ports have counterbores 21.

As has been previously stated, the central hole 16 in casing 2 rotatably receives the operating shaft 4 which projects through the casing 2 at both ends thereof. The end of operating shaft 4 which projects through the planar end face 14 of casing 2 has a disk like valve member 8 secured thereto as by a transverse pin 26. The operating knob 6 is rigidly secured to the other end of operating shaft 4 as by a transverse pin 28.

A unitary resilient seal member 10 is provided formed of synthetic rubber or other suitable fluid sealing material and comprising a generally rectangular sheet-like member having peripheral configuration substantially identical to that of the end face 14 of casing 2. The one face of seal member 10 is preferably a substantially coplanar surface 30 and is held in abutting relation with the co-planar end face 14 of casing 2 by a seal retainer plate or disk 32. The seal member 10 and seal retainer disk 32 are provided with central holes 34 and 34' respectively, which align with the central opening 16 in casing 2 and circumferentially disposed holes 36 and 36' which respectively align with the inlet port openings 20 in end face 14 of casing 2. A cut away portion 33 in disk 32 aligns with outlet port 22 and a triangular shaped hole 37 is provided in seal member 10 to surround such outlet port. The seal retainer disk 32 is secured to casing 2 by a plurality of peripherally spaced flat-headed screws 38, the heads of which are disposed in suitable counterbores in seal retainer disk 32 so as to lie substantially flush with the external surface of the seal retainer 32. Hence, those portions of seal member 10 lying under solid portions of seal retainer 32 are firmly secured to end face 14 of the casing 2 in gasket relationship.

To provide an effective seal between the operating shaft 4 and casing 2 the seal member 10 is provided with an integral, annular, outward projection 40 which surrounds the central hole 34 provided in the seal member 10. The central hole 34 in seal member 10 is preferably proportioned so as to produce a reasonably tight fit upon operating shaft 4. The seal retainer disk 32 is suitably counterbored as at 42 to receive the annular projection 40 of seal member 10. A spring 43 is then mounted in the counterbore 17 of central hole 16 and operates between the base of such counterbore and the adjacent portion of seal member 10 to urge the annular projection 40 into sealing engagement between operating shaft 4 and seal retainer disk 32.

To provide port seals, the seal member 10 is provided with integrally formed annular, outward projections 44 respectively surrounding each of the circumferentially disposed holes 36 in the seal member. The corresponding holes 36' in seal retainer disk 32 are suitably enlarged to snugly receive the annular projections 44 therein. The annular projections 44 are of sufficient height so as to project entirely through and beyond seal retainer disk 32 and to engage the adjacent surface of valve disk 8. To improve the sealing action of the annular projections 44 with valve disk 8, a plurality of springs 45 are provided respectively mounted in the counterbores 21 of the port openings 20 and these springs operate between the base of the counterbores and the adjacent portion of the seal to urge the annular projections 44 outwardly into sealing engagement with the adjacent face of valve disk 8. If desired, increased rigidity and support may be provided for the annular sealing projections 44 by the provision of an annular metallic seal guide 46 which fits snugly within the bore of annular projections 44 and has an end flange portion 50 upon which the springs 45 rest. To permit axial movement of annular seal projections 44 the adjacent edges of openings 36' in seal retainer 32 are provided with a chamfer 37. Similarly, to allow for swelling the counterbores 21 are provided with a chamfer 39.

The valve disk 8 has a main body portion 52 of generally disk-like configuration and an integrally formed hub portion 54 by which it is supported on operating shaft 4. In the illustrated embodiment, valve disk 8 is provided with a single valve aperture 56 which is arranged to be selectively aligned with each of the port openings 20 upon rotation of the operating shaft 4. The periphery of body portion 52 of valve disk 8 is sufficiently large to insure the cooperation of the valve disk with each of the annular port seal portions 44 of seal member 10. As was heretofore stated, there is no annular projection provided on seal member 10 surrounding the outlet opening 37 in seal member 10. Accordingly, due to the transverse enlargement 22 of the outlet port, unimpeded fluid flow will occur through the outlet port irrespective of the particular angular position of the valve disk 8.

It is therefore necessary to provide a sealed cover surrounding the valve disk 8. The cover 12 is of generally dished configuration, having a periphery substantially coinciding with the periphery of th end face 14 of valve casing 2. A suitable mounting flange 58 is provided about the periphery of cover 12 and is provided with suitable spaced holes to receive retaining bolts 60 which are threadably secured in peripheral web-like flanges 62 integrally formed on valve casing 2. To provide a gasket-like seal between the cover 12 and casing 2, the seal member 10 is provided with an integral, peripherally extending portion 64 which is disposed between the flange 58 on cover 12 and the flanges 62 on casing 2 to provide a seal between the members.

To provide a resilient positioning action to the operating shaft 4 to indicate to the operator when the valve aperture 56 of valve disk 8 is aligned with a particular port opening, a spring-pressed ball detent 66 is mounted in a suitable hole 68 provided in operating knob 6 and is urged into engagement with a detent plate 72 by a spring 74. The detent plate 72 is suitably secured to an end face of casing 2 as by a plurality of spaced drive screws 76, and is provided with a plurality of integrally formed, peripherally spaced depressions 78 to respectively receive the ball detent 66 as the operating shaft 4 is rotated to each of the respective operating positions of valve disk 8. The adjacent face of valve casing 2 is provided with suitable recesses or an annular groove 80 to accommodate depressions 78.

It is deemed obvious that the described construction is particularly adaptable to manufacture by quantity production processes. Thus, the casing 2 may be formed of a die casting of aluminum or magnesium. The operating shaft 4 may constitute a piece of drill rod while the valve disk 8, the cover 12, the detent plate 72, and the seal guides 46 may be conveniently formed as stampings. The handle may be completely formed as a molded plastic and the unitary seal member 10 is conveniently formed by molding of synthetic rubber or similar material. As in the case of all components interchangeably manufactured by large quantity production processes, there is a substantial accumulated tolerance when the individual components are assembled into a selector valve unit. The only critical assembly condition in the aforedescribed valve construction is the positioning of the valve disk 8 relative to the exterior face of the sealed retainer 32 to insure that the ends of annular projections 44 of the seal member 10 will engage the adjacent face of valve disk 8 in sealing relation. This condition may be conveniently obtained in the assembly of the aforedescribed selector valve by the insertion of a shim 82' of suitable thickness between the operating knob 6 and the detent plate 72.

To facilitate the panel mounting of the described selector valve, a plurality of integrally formed bosses 82 may be provided on casing 2 having tapped holes 84 therein to receive suitable mounting screws (not shown).

It is therefore apparent that the aforedescribed valve construction provides a selector valve of unusual simplicity in which the various components may be readily produced at low cost by quantity production methods. The assembled valve is nevertheless a rugged structure and provides dependable and long life operation.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. A selector valve comprising a ported casing having a plurality of circumferentially spaced port openings disposed in one face of the casing, a resilient seal member abutting said face in sealing relation thereto, a valve disk having a valve aperture therein, means for supporting said valve disk for rotation adjacent said seal member to selectively align said valve aperture with said port openings, said sealing member having a plurality of upstanding portions aligned with and surrounding each of said port openings and engageable with the adjacent face of said valve disk, and resilient means urging said upstanding portions into sealing engagement with the adjacent face of said valve disk, said valve disk being disposed in spaced relation from the remainder of said sealing member.

2. A selector valve comprising a ported casing having a plurality of circumferentially spaced port openings disposed in one face of the casing, each of said port openings having a counterbore therein, a seal member abutting said face in sealing relation thereto, a valve disk having a valve aperture therein, means for supporting said valve disk for rotation adjacent said seal member to selectively align said valve aperture with said port openings, said sealing member having a plurality of integral annular projections aligned with and surrounding each of said port openings and extending away from said ports to engage the adjacent face of said valve disk, and a plurality of springs respectively mounted in said counterbores and engaging said seal member to urge said annular projections into sealing engagement with the adjacent face of said valve disk, said valve disk being disposed in spaced relation from the remainder of said sealing member.

3. A selector valve comprising a ported casing having a central operating shaft opening and a plurality of port openings disposed in one face of the casing surrounding said central opening, an operating shaft rotatably disposed in said central opening and projecting through said face, a seal member having a substantially planar face abutting said casing face in sealing relation thereto, said seal member having a central and peripherally disposed apertures therein respectively aligned with said central opening and said port openings in said casing, an integral annular projection on said seal member surrounding said central opening, resilient means urging said central projection into sealing engagement with said operating shaft, a valve disk secured to said operating shaft adjacent said seal member, said valve disk having a valve aperture therein selectively alignable with said port openings by rotation of said operating shaft, a plurality of annular projections on said seal member on the face thereof opposite to said planar face respectively surrounding said peripheral openings therein, and resilient means urging said peripheral projections into sealing engagement with the adjacent face of said valve disk, said disk being otherwise free from engagement with said seal member.

4. A selector valve comprising a ported casing having a plurality of circumferentially spaced port openings disposed in one planar face of said casing, a seal member having a planar surface abutting said planar face in sealing relation thereto, a seal retainer disk disposed adjacent said seal member, means securing said seal retainer to said casing to press the planar surface of said seal member against said planar casing face in sealing relation thereto, said seal retainer and said seal member each having a plurality of openings therein respectively aligned with said port openings, a plurality of integral annular projections on said seal member surrounding said openings therein and respectively projecting through said openings in said seal retainer, a valve disk having a valve aperture therein, means for supporting said valve disk for rotation adjacent said seal retainer to selectively align said valve aperture with said port openings, said annular projections of said seal member being engageable with the adjacent face of said valve disk in sealing relation thereto and normally spacing said disk axially away from said retainer disk.

5. A selector valve comprising a ported casing having a substantially planer end face, said casing having a plurality of circumferentially spaced port openings disposed in said planar end face, a resilient seal member having a planar surface abutting said end face, a seal retainer disk disposed adjacent said seal member, means securing said seal retainer to said casing to press said planar surface of said seal member against said planar casing face in sealing relation thereto, said seal retainer and said seal member each having a plurality of openings therein respectively aligned with said port openings, a plurality of integral annular projections on said seal member surrounding said openings therein and respectively projecting through said openings in said seal retainer, a valve disk having a valve aperture therein, means for supporting said valve disk for rotation adjacent said seal retainer to selectively align said valve aperture with said port openings, said annular projections being engageable with said adjacent face of said valve disk, and resilient means for urging said annular projections of said seal member into sealing engagement with the adjacent face of said valve disk and normally spacing said disk axially away from said retainer disk.

6. A selector valve comprising a ported casing having a central operating shaft opening and a plurality of port openings surrounding said central opening and disposed in one end face of the casing, said central opening and said port openings having counterbores therein, an operating shaft rotatably disposed in said central opening and projecting through said end face, a resilient seal member having a substantially planar surface abutting said casing end face, a seal retainer plate disposed adjacent said seal member, means securing said seal retainer to said casing to press said planar surface of said seal member against said casing end face in sealing relation thereto, said seal retainer and said seal member each having a plurality of openings therein respectively aligned with said port openings and said central opening, an integral annular projection on said seal member surrounding said central opening, a spring mounted in said counterbore of said central opening and arranged to urge said central projection into sealing engagement with said operating shaft, a plurality of integral annular projections on said seal member aligned with said peripherally disposed port openings and respectively projecting through said corresponding openings in said seal retainer, a valve disk secured to said operating shaft adjacent said seal member and having a valve aperture therein selectively alignable with said port openings by rotation of said operating shaft, said peripheral annular projections on said seal member being engageable with the adjacent face of said valve disk, and a plurality of springs respectively mounted in said counterbores in said port openings and arranged to urge said annular projections on said seal member into sealing engagement with the adjacent face of said valve disk.

7. A selector valve comprising a ported casing having a central operating shaft opening and a plurality of port openings surrounding said central opening and disposed in one end face of the casing, said central opening and said port openings having counterbores therein, an operating shaft rotatably disposed in said central opening and projecting through said end face, a resilient seal member having a substantially planar surface abutting said casing end face, a seal retainer plate disposed adjacent said seal member, means securing said seal retainer to said casing to press said planar surface of said seal member against said casing end face in sealing relation thereto, said seal retainer and said seal member each having a plurality of openings therein respectively aligned with said port openings and said central opening, an integral annular projection on said seal member surrounding said central opening, a spring mounted in said counterbore of said central opening and arranged to urge said central projection into sealing engagement with said operating shaft, a plurality of integral annular projections on said seal member aligned with said peripherally disposed port openings and respectively projecting through said corresponding openings in said seal retainer, a valve disk secured to said operating shaft adjacent said seal member and having a valve aperture therein selectively alignable with said port openings by rotation of said operating shaft, said peripheral annular projections on said seal member being engageable with the adjacent face of said valve disk, and a plurality of springs respectively mounted in said counterbores in said port openings and arranged to urge said annular projections on said seal member into sealing engagement with the adjacent face of said valve disk, a cover constructed and arranged to surround said valve disk, and means for securing said cover to said casing end face, said seal member having an integral peripheral portion disposed as a gasket between said cover and said casing end face.

THOR O. HOLM.

REFERENCES CITED

The following references are of record in the file of this patent:

UNITED STATES PATENTS

| Number | Name | Date |
|---|---|---|
| 1,427,716 | Bluhm | Aug. 29, 1922 |
| 2,047,131 | Riche | July 7, 1936 |
| 2,153,559 | Hendricks | Apr. 11, 1939 |
| 2,377,473 | Wolcott | June 5, 1945 |
| 2,404,816 | Snyder | July 30, 1946 |